US007173080B2

(12) United States Patent
Yamada et al.

(10) Patent No.: US 7,173,080 B2
(45) Date of Patent: Feb. 6, 2007

(54) BIODEGRADABLE RESIN COMPOSITION FOR MOLDING AND OBJECT MOLDED OR FORMED FROM THE SAME

(75) Inventors: Kazunobu Yamada, Kyoto (JP); Kazue Ueda, Kyoto (JP); Akinobu Ogami, Kyoto (JP); Fumio Matsuoka, Kyoto (JP); Shigeru Hayase, Kyoto (JP); Takuma Yano, Kyoto (JP); Kazuko Yoshimura, Kyoto (JP); Masami Okamoto, Shiga (JP)

(73) Assignee: Unitika Ltd., Hyogo (JP)

( * ) Notice: Subject to any disclaimer, the term of this patent is extended or adjusted under 35 U.S.C. 154(b) by 56 days.

(21) Appl. No.: 10/488,498

(22) PCT Filed: Sep. 3, 2002

(86) PCT No.: PCT/JP02/08956

§ 371 (c)(1),
(2), (4) Date: Mar. 2, 2004

(87) PCT Pub. No.: WO03/022927

PCT Pub. Date: Mar. 20, 2003

(65) Prior Publication Data

US 2005/0043462 A1 Feb. 24, 2005

(30) Foreign Application Priority Data

Sep. 6, 2001 (JP) ............................ 2001-270434

(51) Int. Cl.
*C08K 3/34* (2006.01)

(52) U.S. Cl. ....................... 524/445; 523/124; 523/125

(58) Field of Classification Search ................ 523/124, 523/125; 524/445
See application file for complete search history.

(56) References Cited

U.S. PATENT DOCUMENTS 5,866,645 A * 2/1999 Pinnavaia et al. .......... 524/443

FOREIGN PATENT DOCUMENTS

| JP | 2000-17157 | 1/2000 |
|---|---|---|
| JP | 2001-89646 | 4/2001 |

OTHER PUBLICATIONS

"Polymer Handbook", Brandup et al ed., 1999.*

* cited by examiner

*Primary Examiner*—Edward J. Cain
(74) *Attorney, Agent, or Firm*—Fildes & Outland, P.C.

(57) ABSTRACT

A biodegradable resin composition and an object molded or formed from the composition. The resin composition comprises: 100 parts by weight of a biodegradable polyester resin comprising not smaller than 50% by weight of polylactic acid having a melting point of not lower than 160° C., the biodegradable polyester resin having a melt flow rate of 0.1 to 50 g/10 min as measured under a load of 21.2 N at 190° C.; and 0.1 to 20 parts by weight of a phyllosilicate containing a primary, secondary or tertiary amine salt, a quaternary ammonium salt or a phosphonium salt ionically bonded between layers thereof.

14 Claims, No Drawings

BIODEGRADABLE RESIN COMPOSITION FOR MOLDING AND OBJECT MOLDED OR FORMED FROM THE SAME

TECHNICAL FIELD

The present invention relates to a biodegradable resin composition for molding and to an object molded or formed from the resin composition. Particularly, the invention relates to a composition comprising a phyllosilicate and a biodegradable polyester resin consisting mainly of polylactic acid, and to an object molded or formed from the resin composition. The object molded or formed from this biodegradable resin composition is excellent in mechanical strength, heat resistance, transparency and gas barrier property, and will not accumulate in the natural environment after disposal thereof. Examples of the object include a sheet or a pipe, a food container, a blister package, a press-through package, a fluid container, and an injection-molded product.

BACKGROUND ART

In recent years, biodegradable resins typified by polylactic acid have attracted attention from the viewpoint of environmental conservation. Of the biodegradable resins, the polylactic acid is highly useful, because the polylactic acid is one of the most heat-resistant resins and less costly due to its mass-producibility. However, the polylactic acid is disadvantageously poor in moldability due to its low melt viscosity, and an object molded or formed from the polylactic acid is brittle. Addition of a soft component is a conceivable method for overcoming the brittleness, but is problematic in that the heat resistance characteristic of the polylactic acid is deteriorated.

An attempt is made to accelerate the crystallization by a heat treatment or the like for satisfying the requirements for the heat resistance and the shock resistance. Where the crystallization rate is low, the conditions for the molding and processing are considerably limited, and the impact resistance is still unsatisfactory. For increasing the crystallization rate, a crystalline nucleus agent such as talc or silica is added, but the amount of the agent to be added should be increased for satisfying the requirements for the mechanical characteristics. As a result, the molded object has an increased specific gravity and opacity and, hence, the applications thereof are limited.

On the other hand, JP-A-2000-17157 discloses a composition comprising an aliphatic polyester and an organized phyllosilicate, and a film formed of this composition. In this reference, it is stated that the mechanical strength and the heat sealability are improved by combining the aliphatic polyester with the phyllosilicate. However, no consideration is given to a molded object other than the film. Further, no practical consideration is given to a polylactic acid resin which is poor in moldability.

JP-A-2001-89646 discloses a composition comprising a biodegradable resin and an organically treated phyllosilicate. It is stated that the composition improves the rigidity and the biodegradation rate. However, no practical consideration is given to a molded object. In practice, polylactic acid of a low melting point type which is moldable at 160° C. is employed, so that the resulting resin composition has a lower heat resistance.

DISCLOSURE OF THE INVENTION

To solve the aforesaid problems, it is an object of the present invention to provide a biodegradable resin composition for molding which is excellent in mechanical strength and heat resistance, and an object molded or formed from the resin composition.

Inventors of the present invention have found that a composition comprising a specific biodegradable polyester resin consisting mainly of polylactic acid, and a phyllosilicate having a specific salt ionically bonded between layers thereof, and an object molded or formed from the composition are excellent in mechanical strength, heat resistance, transparency, water resistance and gas barrier property, and attained the present invention.

The inventive biodegradable resin composition for molding comprises: 100 parts by weight of a biodegradable polyester resin comprising not smaller than 50% by weight of polylactic acid having a melting point of not lower than 160° C., the biodegradable polyester resin having a melt flow rate of 0.1 to 50 g/10 min as measured under a load of 21.2 N at 190° C.; and 0.1 to 20 parts by weight of a phyllosilicate containing a primary, secondary or tertiary amine salt, a quaternary ammonium salt or a phosphonium salt ionically bonded between layers thereof.

It is preferred that the phyllosilicate in the inventive biodegradable resin composition for molding has a layer thickness of 1 to 100 nm and an inter-layer distance of not smaller than 2.5 nm, and the resin composition has an Izod impact strength of not smaller than 30 J/m and a thermal deformation temperature of not lower than 100° C.

It is preferred that the phyllosilicate in the inventive biodegradable resin composition for molding has a layer thickness of 1 to 100 nm and an inter-layer distance of not smaller than 2.5 nm, and the resin composition has a flexural modulus of not smaller than 4.4 GPa and a thermal deformation temperature of not lower than 100° C.

The inventive biodegradable resin composition for molding preferably has a haze of not greater than 60.

The inventive biodegradable resin composition for molding preferably has an oxygen permeability of not greater than 160 ml·mm/m$^2$·day·MPa at a temperature of 20° C. at a humidity of 90%.

In the inventive biodegradable resin composition for molding, the phyllosilicate preferably has a K/C ratio of 0.9 to 1.25, wherein K is the amount of the primary, secondary or tertiary amine salt, the quaternary ammonium salt or the phosphonium salt bonded to the phyllosilicate, and C is the cation exchange capacity of the phyllosilicate before the salt is bonded to the phyllosilicate.

The inventive biodegradable resin composition for molding preferably has a weight-average molecular weight of not smaller than 100,000.

The inventive biodegradable resin composition for molding further comprises 0.01 to 10 parts by weight of at least one compound selected from the group consisting of a polyalkylene oxide, an aliphatic polyester, a polyalcohol ester and a polycarboxylic acid ester, based on 100 parts by weight of the biodegradable polyester resin, the compound having a boiling point of not lower than 250° C. and a number-average molecular weight of 200 to 50,000.

In an inventive method for melt-mixing the biodegradable polyester resin with the phyllosilicate and dispersing the phyllosilicate in the biodegradable polyester resin by a kneading process for preparation of the biodegradable resin composition for molding, a shear modulus is controlled at 100 to 300 in the kneading process, and an actual resin temperature is controlled at not higher than (melting point+100)° C. in the kneading process.

An inventive biodegradable resin object is molded or formed from the biodegradable resin composition.

In an inventive method for producing the biodegradable resin object, the object is molded or formed by injection molding, blow molding, extrusion or inflation molding, or vacuum forming, air pressure forming or vacuum air pressure forming after sheeting.

The inventive biodegradable resin object is preferably a sheet or a pipe formed by extrusion.

The inventive biodegradable resin object is preferably a food container, an agricultural/horticultural container, a blister package or a press-through package which is formed by vacuum forming, air pressure forming or vacuum air pressure forming.

The inventive biodegradable resin object is preferably a fluid container which is molded by blow molding or injection molding.

The inventive biodegradable resin object is preferably tableware, a container cap, stationery, a daily commodity, an agricultural/horticultural material, a toy, an electrical appliance resin component, or an automotive resin component which is molded by injection molding.

EMBODIMENTS OF THE INVENTION

A biodegradable polyester resin of the inventive biodegradable resin composition should contain not smaller than 50 wt % of polylactic acid. The proportion of the polylactic acid is preferably not smaller than 60 wt %, more preferably not smaller than 80 wt %. If the proportion of the polylactic acid is smaller than 50 wt %, the resulting biodegradable resin composition is inferior in mechanical strength and heat resistance.

The biodegradable polyester resin should have a melt flow rate of 0.1 to 50 g/10 min as measured under a load of 21.2 N at 190° C. The melt flow rate is preferably 0.2 to 20 g/10 min, more preferably 0.5 to 10 g/min. If the melt flow rate is greater than 50 g/10 min, an object molded or formed from the composition is inferior in mechanical characteristics and heat resistance, because the melt viscosity is too low. If the melt flow rate is smaller than 0.1 g/10 min, a load exerted in a molding process is excessively high, thereby deteriorating the operability.

The polylactic acid employed as a major component of the biodegradable polyester resin in the present invention may be poly(L-lactic acid), poly(D-lactic acid), or a mixture or copolymer of poly(L-lactic acid) and poly(D-lactic acid). The polylactic acid should have a melting point of not lower than 160° C. If the melting point is lower than 160° C., the object molded or formed from the composition is inferior in mechanical characteristics and heat resistance.

The biodegradable polyester resin is typically prepared by employing a known melt polymerization method optionally along with a solid-phase polymerization method. Where the melt flow rate of the biodegradable polyester resin is excessively high, the melt flow rate is adjusted within the predetermined range by increasing the molecular weight of the resin with the use of a small amount of a chain-extending agent such as a diisocyanate compound, a bisoxazolin compound, an epoxy compound or an acid anhydride. Where the melt flow rate is excessively low, a biodegradable polyester resin having a higher melt flow rate or a low molecular weight compound is mixed.

As required, an additional biodegradable resin component may be copolymerized with the biodegradable polyester resin or mixed with the biodegradable polyester resin in a melt mixing process, as long as the mechanical characteristics, heat resistance, transparency and gas barrier property of the polylactic acid is not significantly deteriorated by the additional biodegradable resin component. Examples of the additional biodegradable resin component include: aliphatic polyesters such as poly(ethylene succinate), poly(butylene succinate) and poly(butylene succinate-co-butylene adipate) which are each prepared from a diol and a dicarboxylic acid; polyhydroxycarboxylic acids such as polyglycolic acid, poly(3-hydroxybutyric acid), poly(3-hydroxyvaleric acid) and poly(3-hydroxycaproic acid); poly(ω-hydroxyalkanoate) such as poly(ε-caprolactone) and poly(δ-valerolactone); and poly(butylene succinate-co-butylene terephthalate) and poly(butylene adipate-co-butylene terephthalate) which each contain an aromatic component but yet have biodegradability. Other examples include polyester amides, polyester carbonates, and polysaccharides such as starch.

The phyllosilicate is a swellable lamellar clay mineral, and examples thereof include smectite, vermiculite and swellable fluoromica. Examples of the smectite include montmorillonite, beidellite, hectorite and saponite. Examples of the swellable fluoromica include Na-type tetrasilicic fluoromica, Na-type taeniolite and Li-type taeniolite. Other usable examples include phyllosilicates such as canemite, macatite, magadiite and kenyaite which contain neither aluminum nor magnesium. Besides the natural phyllosilicates, a synthetic phyllosilicate may be employed, which is prepared by any of a melt process, an intercalation process and a hydrothermal process. Any of these phyllosilicates may be used alone. Alternatively, phyllosilicates of different types, different production sites and different particle diameters may be used in combination.

The proportion of the phyllosilicate should be 0.1 to 20 parts by weight based on 100 parts by weight of the biodegradable polyester resin. The proportion of the phyllosilicate is preferably 0.2 to 10 parts by weight. If the proportion is smaller than 0.1 part by weight, it is impossible to provide a mechanical strength improving effect intended by the present invention. If the proportion is greater than 20 parts by weight, it is difficult to finely disperse the phyllosilicate in the resin. Therefore, the toughness of the composition is drastically deteriorated, and the transparency of the composition is reduced.

The phyllosilicate, particularly the smectite, should preliminarily be subjected to an organic cation treatment. The organic cations include primary, secondary and tertiary amines and their salts, quaternary ammonium salts and phosphonium salts. The organic cations are ionically bonded between layers of the phyllosilicate.

Examples of the primary amines include octylamine, dodecylamine and octadecylamine. Examples of the secondary amines include dioctylamine, methyloctadecylamine and dioctadecylamine. Examples of the tertiary amines include trioctylamine, dimethyldodecylamine and didodecylmonomethylamine. Examples of the tertiary ammonium ions include tetraethylammonium, octadecyltrimethylammonium, dimethyldioctadecylammonium, dihydroxyethylmethyloctadecylammonium, methyldodecylbis(polyethylene glycol)ammonium and methyldiethyl(polypropylene glycol)ammonium. Examples of the phosphonium ions include tetraethylphosphonium, tetrabutylphosphonium and hexadecyltributylphosphonium, tetrakis(hydroxylmethyl)phosphonium and 2-hydroxyethyltriphenylphosphonium.

A phyllosilicate treated with an ammonium salt such as dihydroxyethylmethyloctadecylammonium, methyldodecylbis(polyethylene glycol)ammonium, methyldiethyl (polypropylene glycol)ammonium or 2-hydroxyethyltriphenylphosphonium having at least one hydroxyl group in its molecule is particularly preferred because of its strong affinity for the biodegradable polyester resin and its improved dispersibility. The aforesaid compounds may be used either alone or in combination.

For the treatment of the phyllosilicate with the organic cations, inorganic ions in the phyllosilicate are first ion-exchanged with organic onium ions by dispersing the phyllosilicate in water or an alcohol, adding the organic cations in the form of a salt and stirring the resulting mixture. Then, the resulting product is filtered, rinsed and dried.

For improvement of the dispersibility of the phyllosilicate in the biodegradable polyester resin, at least one compound selected from the group consisting of a polyalkylene oxide, an aliphatic polyester, a polyalcohol ester and a polycarboxylic acid ester having an affinity for both the biodegradable polyester resin and the phyllosilicate and having a boiling point of not lower than 250° C. and a number-average molecular weight of 200 to 50,000 may be added as a compatibilizer.

Examples of the polyalkylene oxide include polyethylene glycol, polypropylene glycol and polybutylene glycol, and copolymers thereof. One or two terminal hydroxyl groups of the polyalkylene oxide may be terminated with alkoxyl groups, or esterified with a monocarboxylic aicd or a dicarboxylic acid.

Examples of the aliphatic polyester include: polyhydroxycarboxylic acids such as polylactic acid, polyglycolic acid, poly(3-hydroxybutyric acid), poly(3-hydroxyvaleric acid) and poly(3-hydroxycaproic acid); poly(ω-hydroxyalkanoate) such as poly(ϵ-caprolactone) and poly(δ-valerolactone); and aliphatic polyesters such as poly(ethylene succinate), poly(butylene succinate) and poly(butylene succinate-co-butylene adipate) which are each prepared from a diol and a dicarboxylic acid. A terminal carboxyl group of the aliphatic polyester may be esterified with an alcohol, or substituted with a hydroxyl group with the use of a diol.

Examples of the polyalcohol ester include glycerol esters such as monoglycerides, diglycerides and triglycerides which are esters of glycerol and fatty acids, and pentaerythritol esters. Examples of the polycarboxylic acid ester include citrates such as tributyl citrate, tributyl acetate citrate.

As described above, the compound preferably has a boiling point of not lower than 250° C. A compound having a boiling point of lower than 250° C. is not practical, because gas emanation in the molding process and bleed-out from the resulting molded object are noticeable. The compound preferably has a number-average molecular weight of 200 to 50,000, more preferably 500 to 20,000. A compound having a molecular weight of smaller than 200 is not practical, because gas emanation in the molding process and bleed-out from the resulting molded object are noticeable and the molded object is poorer in mechanical strength and heat resistance. If the molecular weight is greater than 50,000, the intercalation of the compound between layers of the phyllosilicate is insufficient.

The amount of the compound to be added is preferably 0.01 to 10 parts by weight, more preferably 0.02 to 5 parts by weight, based on 100 parts by weight of the biodegradable polyester resin. If the addition amount is smaller than 0.01 part by weight, the effect of the addition is reduced. If the addition amount is greater than 10 parts by weight, the heat resistance and mechanical strength of the biodegradable polyester resin are remarkably reduced.

Exemplary methods for the addition include: a method of preliminarily directly impregnating the phyllosilicate with the compound; a method of mixing the phyllosilicate with the compound in the presence of water or an organic solvent, and then removing the water or the organic solvent by filtration; a method of adding the compound when the biodegradable resin is melt-mixed with the phyllosilicate; and a method of adding the compound together with the phyllosilicate when the biodegradable polyester resin is synthesized. Among these methods, the method of preliminarily mixing the compound with the phyllosilicate is preferred.

The phyllosilicate is preferably dispersed in the resin composition in a completely exfoliated state where the layers of the phyllosilicate are exfoliated from each other, in an intercalated state where molecules of the resin are intercalated between the layers, or in a mixed state where the exfoliated state and the intercalated state are present. From a quantitative viewpoint, the average thickness of single and multiple layers of the phyllosilicate is preferably 1 to 100 nm, more preferably 1 to 50 nm, further more preferably 1 to 20 nm, as observed by means of a transmissive electron microscope. The inter-layer distance of the phyllosilicate is preferably not smaller than 2.5 nm, more preferably not smaller than 3 nm, further more preferably not smaller than 4 nm, as determined by way of an X-ray diffraction pattern. It is most preferable that no peak attributable to the inter-layer distance is observed in the X-ray diffraction pattern. If the average thickness of the single and multiple layers of the phyllosilicate in the resin composition is greater than 100 nm or the inter-layer distance is smaller than 2.5 nm, the resulting molded object is inferior in mechanical strength and transparency.

The dispersibility of the phyllosilicate in the resin is controlled by changing kneading conditions, adding a third component having an affinity for both the resin and the phyllosilicate as a compatibilizer, or introducing polar groups in the resin in the kneading process. In general, the polymerization process can enhance the dispersibility.

In the present invention, a multiplicity of pieces of the phyllosilicate each having a predetermined size are homogeneously dispersed in the biodegradable polyester resin thereby to function as a crystalline nucleus agent. This supposedly increases the crystallization rate. Therefore, various objects can be molded or formed from the inventive biodegradable resin composition by injection molding, blow molding, extrusion or inflation molding, or by vacuum forming, air pressure forming or vacuum air pressure forming after sheeting. Particularly in the injection molding, the molding cycle time can be reduced. This is because the inventive biodegradable resin composition has a higher crystallization rate than an ordinary polylactic acid resin as described above so that the time required for curing the resin composition in a mold by cooling can be reduced.

The inventive biodegradable polyester resin composition containing the phyllosilicate preferably has an improved Izod impact strength of not smaller than 30 J/m, more preferably not smaller than 40 J/m, further more preferably not smaller than 50 J/m. If the Izod impact strength is smaller than 30 J/m, the resulting molded object is brittle and liable to be broken. The Izod impact strength is herein measured in conformity with the ASTM D-256 with a notch (V-shaped notch).

The inventive biodegradable polyester resin composition containing the phyllosilicate preferably has an improved flexural modulus of not smaller than 4.4 GPa. If the flexural modulus is smaller than 4.4 GPa, the resulting molded object is liable to be deformed and, hence, is inadequate for practical use. The flexural modulus is herein measured in conformity with the ASTM D-790.

The inventive biodegradable polyester resin composition containing the phyllosilicate preferably has an improved thermal deformation temperature of not lower than 100° C., more preferably not lower than 110° C., further more preferably not lower than 120° C. If the thermal deformation temperature is lower than 100° C., a container molded from the biodegradable resin composition, for example, is liable to be deformed when hot water is poured therein. The thermal deformation temperature is herein measured in conformity with the ASTM D-648.

The inventive biodegradable polyester resin composition containing the phyllosilicate preferably has a haze of not greater than 60, more preferably not greater than 40, further more preferably not greater than 30. If the haze is greater than 60, undesirable phenomena occur. For example, contents in a container cannot be seen well. The haze is herein measured in conformity with JIS K-7136.

The inventive biodegradable polyester resin composition containing the phyllosilicate preferably has an oxygen permeability of not greater than 160 ml·mm/m$^2$·day·MPa, more preferably not greater than 100 ml·mm/m$^2$·day·MPa, further more preferably not greater than 70 ml·mm/m$^2$·day·MPa, at a temperature of 20° C. at a humidity of 90%. If the oxygen permeability is greater than 160 ml·mm/m$^2$·day·MPa, undesirable phenomena occur. Where a volatile liquid is contained in a fluid container, for example, the liquid escapes from the container so that the volume of the liquid is reduced.

The inventive biodegradable polyester resin composition containing the phyllosilicate preferably has a K/C ratio of 0.9 to 1.25, more preferably 0.95 to 1.1, wherein K is the amount of the primary, secondary or tertiary amine salt, the quaternary ammonium salt or the phosphonium salt bonded to the phyllosilicate, and C is the cation exchange capacity of the phyllosilicate before the salt is bonded to the phyllosilicate. If the K/C ratio is smaller than 0.9, the ion exchange with the ammonium salt or the phosphonium salt is insufficient, so that a greater amount of the phyllosilicate is left unexchanged. Therefore, the dispersibility of the phyllosilicate is deteriorated and, hence, the physical properties tend to be deteriorated. If the K/C ratio is greater than 1.25, an excess amount of the ammonium salt or the phosphonium salt is left as an impurity, so that the physical properties tend to be deteriorated.

The inventive biodegradable resin composition containing the phyllosilicate preferably has a weight-average molecular weight of not smaller than 100,000. The weight-average molecular weight is herein determined by the GPC (gel permeation chromatography) method by employing tetrahydrofuran as a solvent and employing a standard polystyrene sample as a reference. The molecular weight is more preferably not smaller than 120,000. If the molecular weight is smaller than 10,000, the mechanical properties tend to be deteriorated.

A pigment, a heat stabilizer, an oxidation inhibitor, a weather-proof agent, a flame retarder, a plasticizer, a lubricant, a release agent, an antistatic agent, a filler, a crystalline nucleus agent and the like may be added to the inventive biodegradable polyester resin composition, as long as the properties of the resin composition are not significantly damaged by the addition.

Examples of the heat stabilizer and the oxidation inhibitor include hindered phenols, phosphorus compounds, hindered amines, sulfur compounds, copper compounds and halides of alkali metals, which may be used as a mixture.

Exemplary inorganic fillers include talc, calcium carbonate, zinc carbonate, walastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolite, hydrotalcite, metal fibers, metal whisker, ceramic whisker, potassium titanate, boron nitride, graphite, glass fibers and carbon fibers. Exemplary organic fillers include naturally occurring polymers such as starch, cellulose particles, wood powder, bean curd lees, chaff and bran, and their modifications.

Exemplary inorganic crystalline nucleus agents include talc and kaolin. Exemplary organic crystalline nucleus agents include sorbitol compounds, metal salts of benzoic acid and its compounds, metal salts of phosphate and rosin compounds. Use of any of the organic crystalline nucleus agents is preferred, because the biodegradable resin is finely crystallized thereby to have an improved transparency by addition of the agent in a small amount.

A method for mixing the heat stabilizer, the oxidation inhibitor, the plasticizer, the filler, the crystalline nucleus agent and the like in the inventive biodegradable polyester resin composition is not particularly limited. Any of these additives may be added when the biodegradable polyester resin is prepared or when the biodegradable polyester resin is melt-mixed with the phyllosilicate.

Next, an explanation will be given to methods for preparing the inventive biodegradable resin composition. In a first preparation method, the biodegradable polyester resin is melt-mixed with the phyllosilicate with the use of an ordinary extruder such as a single screw extruder, a twin screw extruder, a roll kneader or Brabender. The use of the twin screw extruder is preferred for improving the dispersibility of the phyllosilicate. In a second method for the preparation of the inventive biodegradable polyester composition, a monomer of the biodegradable polyester is polymerized in the presence of a predetermined amount of the phyllosilicate with respect to the monomer to provide the biodegradable polyester resin composition.

In the first preparation method by the melt-mixing, a shear modulus is controlled at 100 to 300 in the kneading process, and an actual resin temperature different from the temperature of the kneader is controlled at not higher than (melting point+100)° C. in the kneading process. The shear modulus F in the kneading process is represented by:

$$F=\{(\pi DN)/H\}\times t$$

wherein D is the average diameter (mm) of the section of a screw of the kneader, N is the rotation speed (rps) of the screw, H is the average depth (mm) of grooves of the screw, and t is the residence time (min) of the material in the kneader. If the shear modulus is greater than 300, the polylactic acid is excessively sheared so that its molecular weight is excessively reduced. If the shear modulus is smaller than 100, the shearing is insufficient, so that the dispersibility of the phyllosilicate in the polyester resin composition is deteriorated. If the actual resin temperature in the kneading process is higher than (melting point+100)° C., the molecular weight of the polylactic acid is excessively reduced.

In a method of a present invention, for producing a biodegradable resin object, it is possible to employ any of an injection molding process, a blow molding process, an extrusion process, an inflation molding process, a post-sheeting vacuum forming process, a post-sheeting air pressure forming process and a post-sheeting vacuum air pressure forming process.

The extrusion process is preferred for producing a biodegradable sheet or pipe, and a T-die technique and a circular die technique may be employed. The extrusion temperature should be not lower than the melting point (Tm) or fluidization temperature of the biodegradable polyester resin composition. The extrusion temperature is preferably in the range of 180 to 230° C., more preferably 190 to 220° C. If the extrusion temperature is too low, the extrusion process is unstabilized or overloaded. Conversely, if the extrusion temperature is too high, the polylactic acid is decomposed, so that the resulting sheet or pipe disadvantageously has a reduced strength or is colored. For improvement of the heat resistance of the resulting biodegradable sheet or pipe, the biodegradable polyester resin composition may be heat-treated at a temperature not lower than its glass transition temperature (Tg) and not higher than (Tm−20)° C. Specifically, the biodegradable sheet or pipe may be used as a material sheet for deep drawing, a material sheet for batch foaming, and for cards such as credit cards, desk pads, transparent resin files, sippers, agricultural/horticultural rigid pipes and the like.

A food container, an agricultural/horticultural container, a blister package and a press-through package may be produced by a deep drawing process by vacuum-forming, air-pressure-forming or vacuum-air-pressure-forming the aforesaid biodegradable sheet. The deep-drawing temperature and the heat treatment temperature are preferably not lower than (Tg+20)° C. and not higher than (Tm−20)° C. of the biodegradable polyester resin composition. If the forming temperature is lower than (Tg+20)° C., the deep drawing is difficult, and the resulting container has an insufficient heat resistance. Conversely, if the forming temperature is higher than (Tm−20)° C., the resulting container has an uneven wall thickness and an uneven orientation thereby to have a reduced impact resistance.

The shapes of the food container, the agricultural/horticultural container, the blister package and the press-through package are not particularly limited, but the sheet is preferably drawn to a depth of not smaller than 2 mm for containing food stuff, articles, pharmaceutical products and the like. The thicknesses of the containers are not particularly limited, but preferably not smaller than 50 μm, more preferably 150 to 500 μm, in consideration of strength requirements. Specific examples of the food container include trays for perishable food, containers for instant food, containers for fast food and containers for box lunch. Specific examples of the agricultural/horticultural container include seedling pots. Specific examples of the blister package include packages for various articles such as stationery, toys and dry batteries in addition to food packages. Specific examples of the press-through packages include containers for pharmaceutical products.

The blow molding process or the injection molding process may be employed for producing a fluid container.

For the blow molding process, it is possible to employ a direct blowing method in which material chips are directly molded, an injection blow molding method in which a preform (bottomed parison) is first injection-molded and then blow-molded, and a stretch blow molding method. It is also possible to employ a hot parison method in which a preform is blow-molded immediately after formation of the preform, or a cold parison method in which a preform is once cooled and unmolded and then heated again to be blow-molded. The blow molding temperature should be not lower than (Tg+20)° C. and not higher than (Tm−20)° C. If the blow-molding temperature is lower than (Tg+20)° C., the molding is difficult, and the resulting container may have an insufficient heat resistance. Conversely, if the blow-molding temperature is higher than (Tm−20)° C., problems may arise such that the resulting container has an uneven wall thickness and blow-down occurs due to reduction of viscosity.

For the injection molding process, it is possible to employ an ordinary injection molding method, a gas injection molding method and an injection press molding method. A cylinder temperature in the injection molding process should be not lower than the Tm or fluidization temperature of the biodegradable polyester resin, and is preferably 180 to 230° C., more preferably 190 to 220° C. If the molding temperature is too low, a short shot occurs in the molding process, and the molding process is unstabilized or overloaded. Conversely, if the molding temperature is too high, the biodegradable polyester resin is decomposed, so that the resulting molded object disadvantageously has a reduced strength or is colored. Further, the mold temperature should be not higher than (Tm−20)° C. of the biodegradable resin. Where the crystallization in the mold is accelerated for improvement of the heat resistance of the biodegradable polyester resin, it is preferred that the mold is kept at a temperature not lower than (Tg+20)° C. and not higher than (Tm−20)° C. for a predetermined period, and then cooled to not higher than Tg. Conversely, where a post crystallization process is performed, it is preferred that the mold is directly cooled to not higher than Tg, and then a heat treatment is performed at a temperature not lower than Tg and not higher than (Tm−20)° C.

The shape of the fluid container is not particularly limited, but the fluid container preferably has a depth of not smaller than 20 mm for containing a fluid. The wall thickness of the container is not particularly limited, but is not smaller than 0.2 mm, preferably 0.5 to 5 mm, in consideration of strength requirements. Specific examples of the fluid container include drinking cups and bottles for dairy products, soft drinks and alcoholic beverages, temporary storage containers for condiments such as soy source, Worcester source, mayonnaise, ketchup and cooking oil, containers for shampoo and rinse agents, containers for cosmetics, and containers for agricultural chemicals.

For production of an injection-molded object, any of the aforesaid injection molding methods may be employed. The shape of the injection-molded object is not particularly limited, but the injection-molded object may have any shape as long as the object can be produced by an injection molding machine. Specific examples of the injection-molded object include tableware such as dishes, bowls, pots, chopsticks, spoons, forks and knives, container caps, stationery such as rulers, writing utensils, transparent cases and CD cases, daily commodities such as sink strainers, wastebaskets, washbowls, toothbrushes, hair combs and dress hangers, agricultural/horticultural materials such as flower pots and seedling pots, toys such as plastic models, electrical appliance resin components such as air conditioner panels, refrigerator trays and housings, and automotive resin components such as bumpers, interior panels and door trims.

The present invention provides a biodegradable resin molded object which is excellent in mechanical characteristics, heat resistance, transparency and gas barrier property. Exemplary applications of the molded object include a sheet or a pipe, a food container, a blister package, a press-through package, a fluid container, and an injection-molded product. The molded object can be composted when being discarded.

Therefore, the molded object can be reused as a fertilizer, and the amount of garbage can be reduced.

EXAMPLES

The present invention will hereinafter be described more specifically by way of examples thereof. However, the invention is not limited to the following examples.

The measurement of the properties of resin compositions of the following examples and comparative examples and the evaluation of molded objects were carried out in the following manner.

(1) Melt Flow Rate (MFR)

The melt flow rate was measured at 190° C. under a load of 21.2 N in conformity with JIS K-7210 (under test conditions 4).

(2) Average Thickness of Layers of Phyllosilicate

In a view field in which 20 or more pieces of the phyllosilicate were observed, the thicknesses of the pieces of the phyllosilicate were visually measured by means of a transmissive electron microscope, and the average of the thicknesses was determined.

(3) Inter-layer Distance of Phyllosilicate

The inter-layer distance was determined by measuring an inter-plane distance $d_{001}$ by means of a wide angle X-ray diffraction method.

(4) Thermal Deformation Temperature

The thermal deformation temperature was measured under a load of 0.45 MPa in conformity with ASTM D-648.

(5) Impact Strength

The Izod impact strength was measured in conformity with ASTM D-256 with the use of a test sample with a notch (V-shaped notch).

(6) Flexural Modulus

The flexural modulus was measured in conformity with ASTM D-790 by applying a load at a deformation rate of 1 mm/min.

(7) Haze

The haze was measured in conformity with JIS K-7136 with the use of a 1-mm thick planar test sample.

(8) Oxygen Permeability

An about 300-μm thick unstretched film was subjected to measurement at 20° C. at 90% RH by means of a differential pressure gas permeability meter GTR-30XAU available from GTR Tech, and the oxygen permeability was determined from the following expression:

$$\text{Oxygen permeability } (\text{ml}\cdot\text{mm/m}^2\cdot\text{day}\cdot MPa) = \text{Oxygen permeation amount } (\text{ml/m}^2\cdot\text{day}\cdot MPa)\times\text{Film thickness (mm)}$$

This value was an indicator of the gas barrier property. The smaller this value is, the more excellent the gas barrier property is.

(9) Bond Amount K

The bond amount was determined from the following expression on the basis of the molecular weight of an inter-layer cation and the ignition loss (%) of the organically treated phyllosilicate at 1000° C.

$$\text{Bond amount } K \text{ (mmol/100 g)} = (\text{Ignition loss/Molecular weight of cation})\times\{100/(100-\text{Ignition loss})\}\times 1000$$

(10) Cation Exchange Capacity C

The cation exchange capacity was determined in conformity with a cation exchange capacity measuring method (JBAS-106-77) for bentonite (powder) specified by Japan Bentonite Industry Association Standard Test Methods.

That is, ion-exchangeable cations present between layers of the phyllosilicate were all exchanged with $NH_4^+$ by a 1N ammonium acetate aqueous solution adjusted at pH7 with the use of an apparatus including a leaching solution container, a leaching tube and a receiving container vertically connected to one another. The resulting $NH_4^+$-type phyllosilicate was sufficiently rinsed with water and ethyl alcohol, and then immersed in a 10 wt % potassium chloride aqueous solution for exchanging $NH_4^+$ in the sample with $K^+$. Then, $NH_4^+$ leached out by the aforesaid ion exchange reaction was titrated with a 0.1N sodium hydroxide aqueous solution for neutralization. Thus, the cation exchange capacity C (meq/100 g) of the swellable phyllosilicate material was determined.

The molded objects were evaluated in the following manner.

(11) Moldability

A symbol ○ indicates excellent moldability where the molding process was performed with no problem, and a symbol X indicates poor moldability where the molding process was not properly performed with uneven thickness and/or poor releasability.

(12) Heat Resistance

The molded objects were each immersed in a hot water bath at 95° C. for five minutes. A symbol ○ indicates excellent heat resistance where the molded object was deformed by smaller than 1%, and a symbol X indicates poor heat resistance where the molded object was deformed by not smaller than 1%.

(13) Impact Resistance

Ten molded objects of each type were fixed on a floor, and a 10 g steel ball was dropped onto the molded objects from a height of 1 m. A symbol ○ indicates excellent impact resistance where none of the molded objects were broken, and a symbol X indicates poor impact resistance where one or more of the molded objects were broken.

(14) Transparency

The molded objects were each visually evaluated. That is, in the case of a food tray, a symbol ○ indicates excellent transparency where contents in the tray were identified, and a symbol X indicates poor transparency where the contents in the tray were not identified. In the case of a bottle which was filled with colorless liquid, a symbol ○ indicates excellent transparency where a liquid level was identified, and a symbol X indicates poor transparency where the liquid level was not identified. In the case of a spoon, a symbol ○ indicates excellent transparency where letters seen through the spoon were identified, and a symbol X indicates poor transparency where the letters were not identified.

Example 1

Resin Composition A 100 parts by weight of polylactic acid (PLA) (NatureWorks 4030D available from Cargill Dow, and having an MFR of 3.0 and a melting point of 166° C.), 4 parts by weight of a swellable synthetic fluoromica having a dihydroxyethylmethyldodecylammonium salt between layers thereof (2(HE)C12N-MICA) (SOMASIF MEE available from CO-OP Chemical) as a phyllosilicate, and 0.5 parts by weight of polycaprolactondiol (PCL2000) (PRAKCEL L220AL available from Daicel Chemical Industries) as a compatibilizer were mixed together, and the mixture was melt-kneaded at 190° C. by means of a twin screw extruder with a screw diameter of 45 mm. Thus, a resin composition A was prepared. Test samples were prepared from the resin composition thus prepared, and the properties thereof were evaluated. The results are shown in Table 1.

TABLE 1

| | Formulation | | | | |
|---|---|---|---|---|---|
| | Resin composition | Biodegradable resin | Phyllosilicate (parts by weight) | K/C | Compatibilizer (parts by weight) |
| Example 1 | A | PLA | 2 (HE) C12N-MICA (4) | 1.07 | PCL2000 (0.5) |
| Example 2 | B | PLA | C18N-MMT (4) | 1.22 | PCL2000 (0.5) |
| Example 3 | C | PLA/PBS | C18N-MMT (4) | 1.22 | — |
| Example 4 | D | PLA/PBAT | 2C18N-MICA (4) | 0.91 | PEG2000 (0.5) |
| Example 5 | E | PLA | 2 (HE) C12N-MICA (2) | 1.07 | — |
| Comparative Example 1 | F | PLA | 2 (HE) C12N-MICA (0.05) | 1.07 | — |
| Comparative Example 2 | G | PBS | C18N-MMT (4) | 1.22 | PEG2000 (0.5) |
| Comparative Example 3 | H | PCL | C18N-MMT (4) | 1.22 | — |
| Comparative Example 4 | I | PLA (no melting point) | 2 (HE) C12N-MICA (4) | 1.07 | PCL2000 (0.5) |

| | Properties | | | | | | | |
|---|---|---|---|---|---|---|---|---|
| | Molecular weight (Mw) | Average layer thickness (nm) | Inter-layer distance (nm) | Thermal deformation temperature (° C.) | Impact strength (J/m) | Flexural modulus (GPa) | Haze | Oxygen permeability (ml · mm/m$^2$ · day · MPa) |
| Example 1 | 144,000 | 6 | >6 | 140 | 32 | 4.7 | 37 | 75 |
| Example 2 | 162,000 | 32 | 3.8 | 139 | 37 | 4.5 | 45 | 145 |
| Example 3 | 142,000 | 36 | 3.6 | 120 | 43 | 4.1 | 60 | 140 |
| Example 4 | 141,000 | 15 | 3.5 | 123 | 45 | 4.2 | 57 | 152 |
| Example 5 | 152,000 | 6 | >6 | 126 | 42 | 4.4 | 22 | 114 |
| Comparative Example 1 | 181,000 | 5 | >6 | 132 | 26 | 3.8 | 12 | 200 |
| Comparative Example 2 | 132,000 | 42 | 3.1 | 93 | 55 | 0.9 | 89 | 215 |
| Comparative Example 3 | 120,000 | 45 | 3.2 | 56 | 480 | 0.6 | 75 | 265 |
| Comparative Example 4 | 156,000 | 6 | >6 | 60 | 32 | 4.2 | 36 | 123 |

Example 2

Resin Composition B 100 parts by weight of polylactic acid (PLA) (NatureWorks 4030D available from Cargill Dow, and having an MFR of 3.0 and a melting point of 166° C.), 4 parts by weight of montmorillonite having an octadecylammonium salt between layers thereof (C18N-MMT) (ODA-CWC available from Nanocor) as a phyllosilicate, and 0.5 parts by weight of polycaprolactondiol (PCL2000) (PRAKCEL L220AL available from Daicel Chemical Industries) as a compatibilizer were mixed together, and the mixture was melt-kneaded at 190° C. by means of a twin screw extruder with a screw diameter of 45 mm. Thus, a resin composition B was prepared. Test samples were prepared from the resin composition thus prepared, and the properties thereof were evaluated. The results are shown in Table 1.

Example 3

Resin Composition C

A blend of polylactic acid and polybutylene succinate was employed as a biodegradable polyester resin. More specifically, 95 parts by weight of polylactic acid (PLA) (NatureWorks 4030D available from Cargill Dow, and having an MFR of 3.0 and a melting point of 166° C.) and 5 parts by weight of polybutylene succinate (PBS) (BIONOLE 1903 available from Showa Highpolymer, and having an MFR of 4.5) (the resulting biodegradable polyester resin has an MFR of 3.1 as a whole), and 4 parts by weight of montmorillonite having an octadecylammonium salt between layers thereof (C18N-MMT) (ODA-CWC available from Nanocor) as a phyllosilicate were mixed together without the use of a compatibilizer, and the mixture was melt-kneaded at 190° C. by means of a twin screw extruder with a screw diameter of 45 mm. Thus, a resin composition C was prepared. Test samples were prepared from the resin composition thus prepared, and the properties thereof were evaluated. The results are shown in Table 1.

Example 4

Resin Composition D

The following blend was employed as a biodegradable polyester resin. More specifically, 95 parts by weight of polylactic acid (PLA) (NatureWorks 4030D available from Cargill Dow, and having an MFR of 3.0 and a melting point of 166° C.) and 5 parts by weight of poly(butylene adipate-co-butylene terephthalate) (PBAT) (Ecoflex available from BASF, and having an MFR of 6.5) (the resulting biodegradable polyester resin has an MFR of 3.2 as a whole), 4 parts by weight of a swellable fluoromica having a dimethyloctadecylammonium salt between layers thereof (2C18N-MICA) (SOMASIF MAE available from CO-OP Chemical) as a phyllosilicate, and 0.5 parts by weight of polyethyelene glycol (PEG2000) as a compatibilizer were mixed together, and the mixture was melt-kneaded at 190° C. by means of a twin screw extruder with a screw diameter of 45 mm. Thus, a resin composition D was prepared. Test samples were prepared from the resin composition thus prepared, and the properties thereof were evaluated. The results are shown in Table 1.

Example 5

Resin Composition E 100 parts by weight of polylactic acid (PLA) (NatureWorks 4030D available from Cargill Dow, and having an MFR of 3.0 and a melting point of 166° C.), and 2 parts by weight of a swellable synthetic fluoromica having a dihydroxyethylmethyldodecylammonium salt between layers thereof (2(HE)C12N-MICA) (SOMASIF MEE available from CO-OP Chemical) were mixed together without the use of a compatibilizer, and the mixture was melt-kneaded at 190° C. by means of a twin screw extruder with a screw diameter of 45 mm. Thus, a resin composition E was prepared. Test samples were prepared from the resin composition thus prepared, and the properties thereof were evaluated. The results are shown in Table 1.

Comparative Example 1

Resin Composition F 100 parts by weight of polylactic acid (PLA) (NatureWorks 4030D available from Cargill Dow, and having an MFR of 3.0 and a melting point of 166° C.), and 0.05 parts by weight of a swellable synthetic fluoromica having a dihydroxyethylmethyldodecylammonium salt between layers thereof (2(HE)C12N-MICA) (SOMASIF MEE available from CO-OP Chemical) as a phyllosilicate were mixed together without the use of a compatibilizer, and the mixture was melt-kneaded at 190° C. by means of a twin screw extruder with a screw diameter of 45 mm. Thus, a resin composition F was prepared. Test samples were prepared from the resin composition thus prepared, and the properties thereof were evaluated. The results are shown in Table 1.

Comparative Example 2

Resin Composition G

100parts by weight of polybutylene succinate (PBS) (BIONOLE 1903 available from Showa Highpolymer, and having an MFR of 4.5) (no polylactic acid was employed), 4 parts by weight of montmorillonite having an octadecylammonium salt between layers thereof (C18N-MMT) (ODA-CWC available from Nanocor), and 0.5 parts by weight of polyethylene glycol (PEG2000) as a compatibilizer were mixed together, and the mixture was melt-kneaded at 170° C. by means of a twin screw extruder with a screw diameter of 45 mm. Thus, a resin composition G was prepared. Test samples were prepared from the resin composition thus prepared, and the properties thereof were evaluated. The results are shown in Table 1.

Comparative Example 3

Resin Composition H 100 parts by weight of poly(ϵ-caprolantone) (PCL) (CELGREEN P-HB02 available from Daicel Chemical Industries, and having an MFR of 2.7) (no polylactic acid was employed), and 4 parts by weight of montmorillonite having an octadecylammonium salt between layers thereof (C18N-MMT) (ODA-CWC available from Nanocor) were mixed together without the use of a compatibilizer, and the mixture was melt-kneaded at 150° C. by means of a twin screw extruder with a screw diameter of 45 mm. Thus, a resin composition H was prepared. Test samples were prepared from the resin composition thus prepared, and the properties thereof were evaluated. The results are shown in Table 1.

Comparative Example 4

Resin Composition I 100 parts by weight of polylactic acid (PLA) (NatureWorks 4060D available from Cargill Dow, and having an MFR of 3.5 and no melting point), 4 parts by weight of a swellable synthetic fluoromica having a dihydroxyethylmethyldodecylammonium salt between layers thereof (2(HE)C12N-MICA) (SOMASIF MEE available from CO-OP Chemical), and 0.5 parts by weight of polycaprolactondiol (PCL2000) (PRAKCEL L220AL available from Daicel Chemical Industries) as a compatibilizer were mixed together, and the mixture was melt-kneaded at 150° C. by means of a twin screw extruder with a screw diameter of 45 mm. Thus, a resin composition I was prepared. Test samples were prepared from the resin composition thus prepared, and the properties thereof were evaluated. The results are shown in Table 1.

The resin compositions A to E of Examples 1 to 5, which each had a formulation according to the present invention, satisfied the requirements for the thermal deformation temperature, the impact strength, the flexural modulus, the haze and the oxygen permeability.

The resin composition F of Comparative Example 1 contained the phyllosilicate in a proportion of 0.05 parts by weight which is lower than the lower limit of the range defined by the present invention. Therefore, the resin composition was excellent in transparency, but did not satisfy the requirements for the mechanical characteristics, i.e., the impact strength and the flexural modulus, and had an excessively high oxygen permeability.

The resin composition G of Comparative Example 2 and the resin composition H of Comparative Example 3 contained no polylactic acid as the biodegradable polyester resin. Therefore, the resin compositions each had a lower heat resistance and an extremely deteriorated flexural modulus, and were poor in haze and oxygen permeability.

The resin composition I of Comparative Example 4 contained the polylactic acid having no melting point and, therefore, was poor in heat resistance.

Examples 6 to 10 and Comparative Example 5 to 8

Vacuum Forming After Sheeting

The resin compositions shown in Table 2 were each melted and extruded from a T-die at a temperature of 200° C. by means of a twin screw extruder with a screw diameter of 45 mm. Thus, a 400 μm thick unstretched sheet was prepared. The unstretched sheet was heated at 120° C., and then vacuum-formed into a food tray having a length of 180 mm, a width of 120 mm and a depth of 30 mm. The properties of the food tray thus prepared are shown in Table 2.

TABLE 2

| | Resin composition | Molding method | Molded object | | | |
|---|---|---|---|---|---|---|
| | | | Moldability | Heat resistance | Impact resistance | Transparency |
| Example 6 | A | Sheet→Vacuum forming | ○ | ○ | ○ | ○ |
| Example 7 | B | Sheet→Vacuum forming | ○ | ○ | ○ | ○ |
| Example 8 | C | Sheet→Vacuum forming | ○ | ○ | ○ | ○ |
| Example 9 | D | Sheet→Vacuum forming | ○ | ○ | ○ | ○ |
| Example 10 | E | Sheet→Vacuum forming | ○ | ○ | ○ | ○ |
| Example 11 | A | Blow molding | ○ | ○ | ○ | ○ |
| Example 12 | B | Injection molding | ○ | ○ | ○ | ○ |
| Comparative Example 5 | F | Sheet→Vacuum forming | ○ | ○ | X | ○ |
| Comparative Example 6 | G | Sheet→Vacuum forming | ○ | X | ○ | X |
| Comparative Example 7 | H | Sheet→Vacuum forming | ○ | X | ○ | X |
| Comparative Example 8 | I | Sheet→Vacuum forming | X | X | ○ | ○ |
| Comparative Example 9 | F | Blow molding | ○ | ○ | X | ○ |
| Comparative Example 10 | H | Injection molding | ○ | X | ○ | X |
| Comparative Example 11 | I | Injection molding | X | X | ○ | ○ |

Example 11 and Comparative Example 9

Blow Molding

By means of an injection blow molding machine (ASB-50TH available from Nissei ASB Machine), resin compositions shown in Table 2 were each melted controlled at a cylinder temperature 200° C. and filled in a mold at 10° C., and then cooled for 30 seconds. Thus, a 4-mm thick preform (bottomed parison) was provided. The preform was heated by hot air at 80° C., and put in a mold. Then, the preform is blown longitudinally three times and transversely 2.5 times by air pressurized at 0.4 MPa. Thus, a bottle having a volume of 900 ml was produced. The properties of the bottle thus produced are shown in Table 2.

Example 12 and Comparative Examples 10 and 11

Injection Molding

By means of an injection molding machine (IS-80G available from Toshiba Machine), resin compositions shown in Table 2 were each melted at a cylinder temperature 200° C. and injected into a mold controlled at 10° C. at an injection pressure of 100 MPa for an injection period of 12 seconds, and then cooled for 20 seconds. Thus, a spoon as a molded object was produced. The spoon thus produced was heat-treated at 120° C. for 5 minutes. The properties of the resulting spoon are shown in Table 2.

The molded objects of Examples 6 to 12 of the present invention were excellent in moldability, heat resistance, impact resistance and transparency.

On the contrary, the molded object of Comparative Example 5 was inferior in impact resistance, because the material had an excessively low impact strength due to an excessively low content of the phyllosilicate.

The molded objects of Comparative Examples 6 and 7 were inferior in heat resistance and transparency, because the materials each contained no polylactic acid.

The molded object of Comparative Example 8 was inferior in moldability and heat resistance, because the polylactic acid of the material had no melting point and, hence, the sheet had an excessively low heat resistance.

The molded object of Comparative Example 9 was inferior in impact resistance, because the material had an excessively low impact strength due to an excessively low content of the phyllosilicate.

The molded object of Comparative Example 10 was inferior in heat resistance and transparency, because the material contained no polylactic acid.

The molded object of Comparative Example 11 was inferior in moldability with poorer unmolding releasability, because the polylactic acid of the material had no melting point. Further, the molded object was inferior in heat resistance, because the polylactic acid of the material had no melting point.

What is claimed is:

1. A biodegradable resin composition for molding comprising:

100 parts by weight of a biodegradable polyester resin comprising not smaller than 50% by weight of polylactic acid having a melting point of not lower than 160° C., the biodegradable polyester resin having a melt flow rate of 0.1 to 50 g/10 mm as measured under a load of 21.2 N at 190° C.;

0.1 to 20 parts by weight of a phyllosilicate containing a primary, secondary or tertiary amine salt, a quaternary ammonium salt or a phosphonium salt ionically bonded between layers thereof; and 0.01 to 10 parts by weight of at least one compound selected from the group consisting of a polyalkylene oxide, an aliphatic polyester, a polyalcohol ester and a polycarboxylic acid ester, based on 100 parts by weight of the biodegradable polyester resin, the compound having a boiling point of not lower than 250° C. and a number-average molecular weight of 200 to 50,000.

2. A biodegradable resin composition for molding as set forth in claim 1, wherein the phyllosilicate has a layer thickness of 1 to 100 nm and an inter-layer distance of not smaller than 2.5 nm, the resin composition having a thermal deformation temperature of not lower than 100° C.

3. A biodegradable resin composition for molding as set forth in claim 1, wherein the phyllosilicate has a layer thickness of 1 to 100 nm and an inter-layer distance of not smaller than 2.5 nm, the resin composition having a flexural modulus of not smaller than 4.4 GPa and a thermal deformation temperature of not lower than 100° C.

4. A biodegradable resin composition for molding as set forth in claim 1, which has a haze of not greater than 60.

5. A biodegradable resin composition for molding as set forth in claim 1, which has an oxygen permeability of not greater than 160 ml·mm/m$^2$·day·MPa at a temperature of 20° C. at a humidity of 90%.

6. A biodegradable resin composition for molding as set forth in claim 1, wherein the phyllosilicate has a K/C ratio of 0.9 to 1.25, wherein K is an amount of the primary, secondary or tertiary amine salt, the quaternary ammonium salt or the phosphonium salt bonded to the phyllosilicate, and C is a cation exchange capacity of the phyllosilicate before the salt is bonded to the phyllosilicate.

7. A biodegradable resin composition for molding as set forth in claim 1, which has a weight-average molecular weight of not smaller than 100,000.

8. A method for melt-mixing a biodegradable polyester resin with a phyllosilicate and dispersing the phyllosilicate in the biodegradable polyester resin by a kneading process for preparation of a biodegradable resin composition for molding including 100 parts by weight of a biodegradable polyester resin comprising not smaller than 50% by weight of polylactic acid having a melting point of not lower than 160° C., the biodegradable polyester resin having a melt flow rate of 0.1 to 50 g/10 mm as measured under a load of 21.2 N at 190° C., and 0.1 to 20 parts by weight of a phyllosilicate containing a primary, secondary or tertiary amine salt, a quaternary ammonium salt or a phosphonium salt ionically bonded between layers thereof, the method comprising:

controlling a shear modulus at 100 to 300 in the kneading process; and controlling an actual resin temperature at not higher than (melting point+100)° C. in the kneading process.

9. A biodegradable resin object which is molded or formed from a biodegradable resin composition as set forth in any one of claims 1 to 7.

10. A method for producing a biodegradable resin object as set forth in claim 9, the method comprising molding or forming the object by injection molding, blow molding, extrusion or inflation molding, or by vacuum forming, air pressure forming or vacuum air pressure forming after sheeting.

11. A biodegradable resin object as set forth in claim 9, which is a sheet or a pipe formed by extrusion.

12. A biodegradable resin object as set forth in claim 9, which is a food container, an agricultural/horticultural container, a blister package or a press-through package formed by vacuum forming, air pressure forming or vacuum air pressure forming.

13. A biodegradable resin object as set forth in claim 9, which is a fluid container molded by blow molding or injection molding.

14. A biodegradable resin object as set forth in claim 9, which is tableware, a container cap, stationery, a daily commodity, an agricultural/horticultural material, a toy, an electrical appliance resin component or an automotive resin component molded by injection molding.

* * * * *